Feb. 10, 1959 S. VAN TUYL 2,872,844
UNIVERSAL COLLAPSIBLE TRANSPARENCY VIEWER
Filed May 4, 1956 3 Sheets-Sheet 1
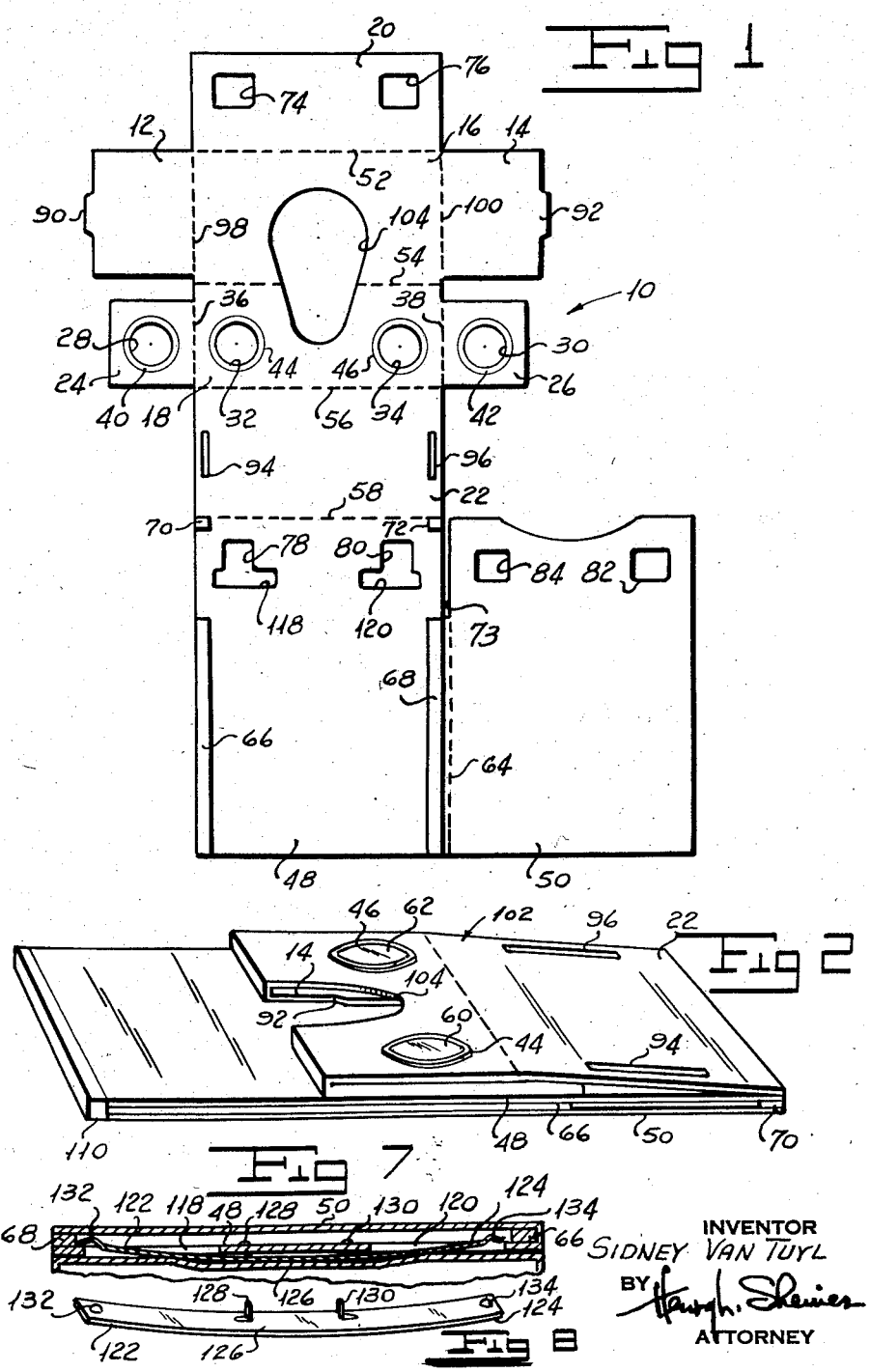
INVENTOR
SIDNEY VAN TUYL
BY
ATTORNEY

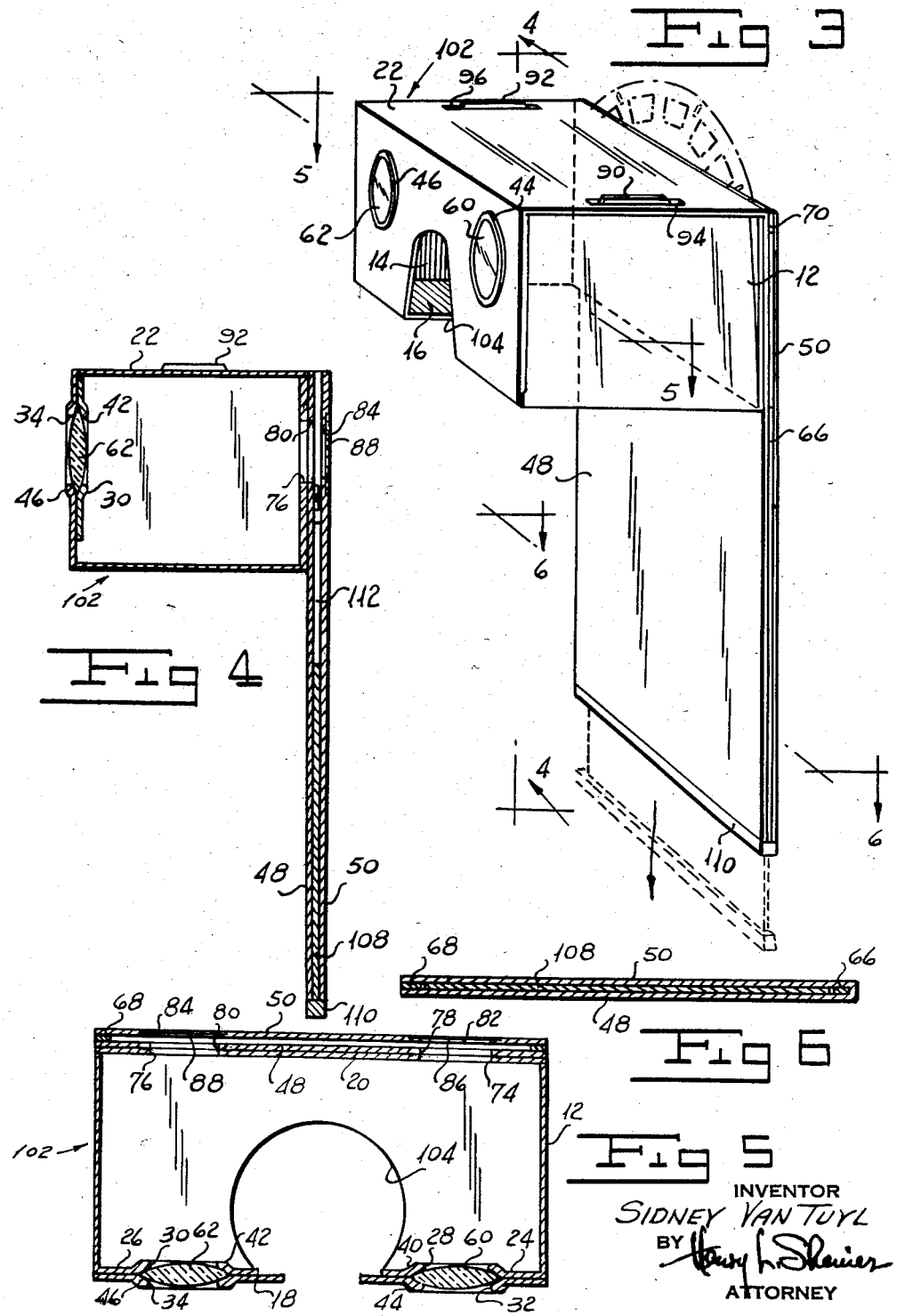

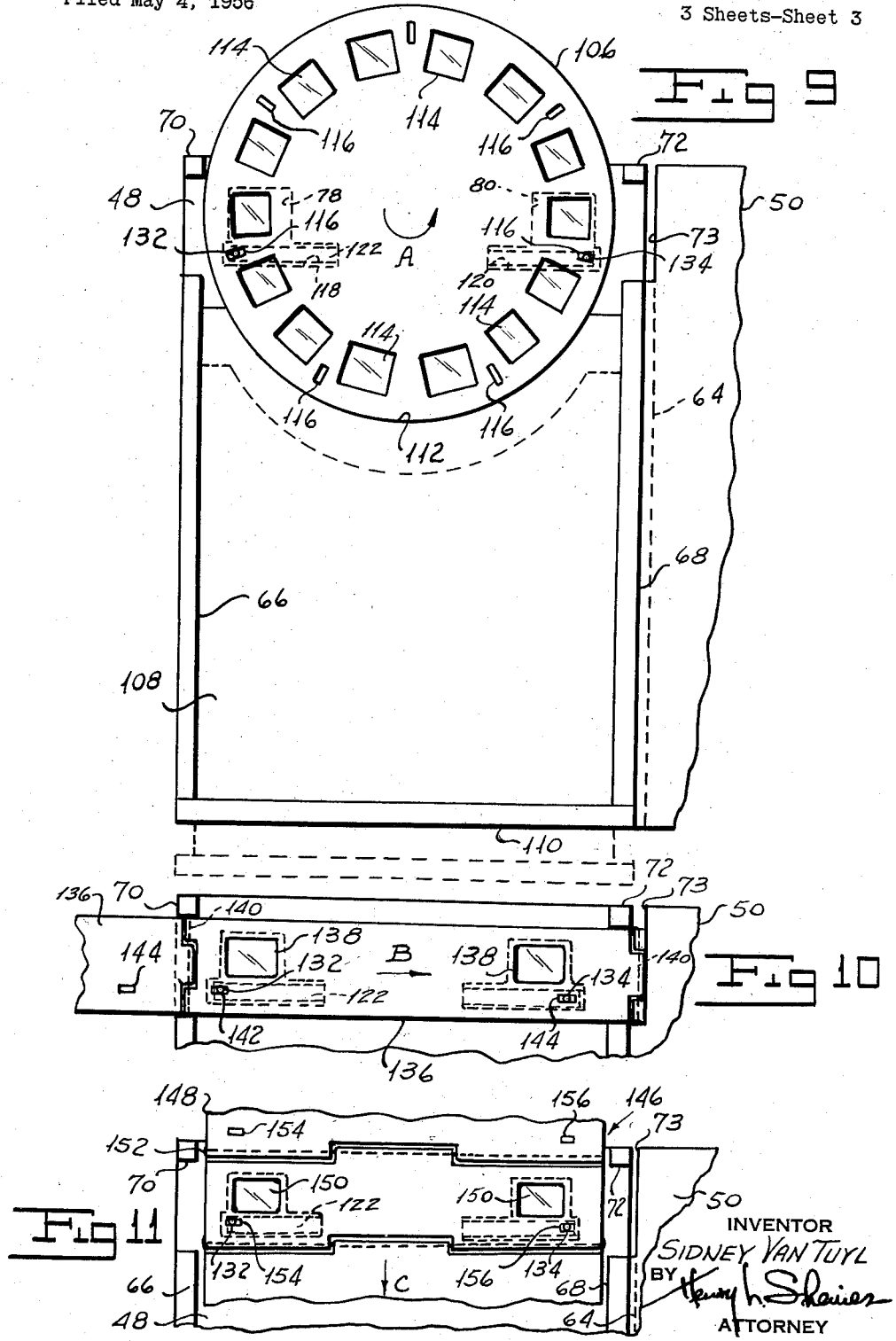

United States Patent Office 2,872,844
Patented Feb. 10, 1959

2,872,844

UNIVERSAL COLLAPSIBLE TRANSPARENCY VIEWER

Sidney Van Tuyl, Fort Pierce, Fla.

Application May 4, 1956, Serial No. 582,891

6 Claims. (Cl. 88—29)

My invention relates to a universal collapsible transparency viewer and more particularly to a universal collapsible transparency viewer which may readily be erected or collapsed and which is adapted to view transparencies carried by vertically movable, laterally movable and rotary carriers.

Stereoscopic transparency viewers are known in the prior art. These viewers include a permanently formed housing enclosing a space into which light is admitted through suitable windows. Means are provided for positioning film frames or other transparencies to be viewed within the housing in registry with the windows to permit the light admitted by the windows to pass through the transparencies. Lenses carried by the housing permit the transparencies to be viewed binocularly with the desired stereoscopic effect by reason of the light transmitted through the transparencies. It will be appreciated that owing to the fact that these transparency viewers of the prior art are formed with a permanent housing generally made of rigid material such as metal, plastic, or the like, they are cumbersome and inconvenient to transport.

Collapsible stereopticons which rely for their operation on light reflected from the picture being viewed also are known in the prior art. These devices include an open area between the viewing lenses and the pictures for permitting light to fall on the pictures. It is necessary in a transparency viewer that the housing prevent light from falling on the face of the transparency since leakage light detracts from the image resulting from transmitted light. In other words, the transparency viewer housing should advantageously prevent the entry of light into the enclosed area except through the windows provided. For this reason, it has not been possible to adapt the collapsible structures of stereopticons relying on reflected light to transparency viewers.

Transparencies such as film frames, or the like, to be viewed are arranged in one of three types of carriers. In the first type of carrier the frames of a pair of film frames depicting a scene to be viewed are disposed in diametrically opposite relationship on a rotary disk, wheel, or the like. As the disk is stepped around its axis, successive scenes, each depicted on a pair of transparencies, successively are viewed. Another type of transparency viewer is adapted to move vertically with respect to the viewing device successively to present in a position to be viewed respective pairs of film frames or the like, each pair of which depicts a scene. A third type of carrier moves laterally of the viewer. Each of the transparency viewers of the prior art is adapted to view transparencies mounted in only one of the three types of carriers described above. The viewer includes means for positioning the carrier so that a pair of transparencies representing the scene to be viewed registers properly with the pair of windows of the viewer. The desirability of providing a universal viewer for receiving and properly positioning all three types of carriers is obvious.

I have invented a stereoptic transparency viewer which is collapsible for easy handling and transportation. My viewer may readily be erected to receive a transparency carrier. I provide my viewer with universal positioning means adapted to receive and to position properly carriers of any of the three types known in the art. My viewer is inexpensive to manufacture and simple in its construction. It is lightweight and it may readily be transported, as by mailing in an envelope.

One object of my invention is to provide a universal collapsible transparency viewer which may readily be erected to view transparencies and collapsed for storage and carrying.

Another object of my invention is to provide a universal collapsible transparency viewer which is adapted to permit viewing of transparencies mounted in a vertically movable carrier, a transversely movable carrier, and a rotary carrier.

A still further object of my invention is to provide a universal collapsible transparency viewer which is simple to construct and inexpensive to manufacture.

Other and further objects will appear from the following description:

In general my invention contemplates the provision of a universal collapsible transparency viewer including a collapsible housing enclosing a space to which light is admitted through a pair of spaced windows. I provide my viewer with means for positioning a pair of film frames or the like, depicting a scene to be viewed, within the housing in registry with the pair of windows. A pair of lenses carried by the housing permits the transparencies, such as film frames, to be viewed by reason of the transmission of light, admitted by the windows, through the transparencies. The positioning means of my viewer is adapted to receive and position carriers of the vertically moving, laterally moving, and rotary types.

In the accompanying drawings which form part of the instant specification and which are to be read in conjunction therewith and in which like reference numerals are used to indicate like parts in the various views:

Figure 1 is a plan view of a die-cut blank from which my universal collapsible transparency viewer is formed.

Figure 2 is a perspective view of my assembled universal collapsible transparency viewer with its housing collapsed.

Figure 3 is a perspective view of my universal collapsible transparency viewer with its housing erected.

Figure 4 is a sectional view of my universal collapsible transparency viewer taken along the line 4—4 of Figure 3.

Figure 5 is a sectional view of my universal collapsible transparency viewer taken along the line 5—5 of Figure 3.

Figure 6 is a sectional view of my universal collapsible transparency viewer taken along the line 6—6 of Figure 3.

Figure 7 is a fragmentary sectional view of my universal collapsible transparency viewer showing my universal positioning means.

Figure 8 is a perspective view of the positioning spring of my universal collapsible transparency viewer.

Figure 9 is a fragmentary elevation of my universal collapsible transparency viewer with a part removed and showing the use of my viewer with a rotary transparency carrier.

Figure 10 is a fragmentary elevation of my universal collapsible transparency viewer with a part removed showing the use of my viewer with a laterally moving transparency carrier.

Figure 11 is a fragmentary elevation of my universal collapsible transparency viewer with a part removed showing the use of my viewer with a vertically moving transparency carrier.

More particularly referring now to Figure 1 of the drawings, I die-cut a viewer-forming blank, indicated generally by the reference character 10, from paper tag stock having a thickness of about 0.020 to 0.022 inch. I cut the blank 10 and provide it with folding lines to form a pair of respective collapsible housing sides 12 and 14, a housing base 16, a housing front 18, a housing back 20 and a housing top 22. A pair of lens-holding wings 24 and 26 extend laterally from front 18. A pair of respective openings 28 and 30 in wings 24 and 26 register with respective openings 32 and 34 in front 18 when wings 24 and 26 are bent along folding lines 36 and 38 in a direction into the paper as viewed in Figure 1 over the front 18. I provide openings 28 and 30 with embossed rims 40 and 42 and openings 32 and 34 with embossed rims 44 and 46. Rims 40 and 42, together with the respective rims 44 and 46 form sockets for the viewer lenses, to be described hereinafter, when wings 24 and 26 are folded over the front 18. The blank 10 also includes the respective front wall 48 and rear wall 50 of a transparency carrier support, to be described hereinafter.

Referring now to Figures 1 to 5, in order to assemble my viewer, I first fold the respective back 20, bottom 16, front 18 and top 22 in a direction into the paper as viewed in Figure 1 along folding lines 52, 54, 56 and 58. I secure the back 20 to the front wall 48 with its long edge registering with line 58. Any suitable adhesive such as glue or the like may be used to retain back 20 on front wall 48. I dispose a pair of lenses 60 and 62 under embossed rims 44 and 46 and fold wings 24 and 26 in a direction into the paper as viewed in Figure 1 over front 18 to retain the lenses in the sockets formed by the rims 40 and 42 and 44 and 46. Any suitable adhesive such as glue or the like may be used to secure wings 24 and 26 to front 18. It is to be understood that the operation of assembling lenses 60 and 62 in their sockets may be performed before or after the housing members are folded and before or after back 20 is glued to front wall 48.

I provide a relatively thick folding line 64 between front wall 48 and rear wall 50. I fold wall 50 over wall 48 along line 64 in a direction out of the paper as viewed in Figure 1. A pair of spaced guides 66 and 68 glued to wall 48 separate the walls 48 and 50 when my viewer is assembled. As can be seen by reference to Figure 1, guides 66 and 68 extend a predetermined distance from the lower edges of walls 48 and 50 toward the upper edges. A second pair of guides 70 and 72 are glued between the walls at their upper edges. Guides 66, 68, 70 and 72 preferably are formed from paper board having a thickness of approximately 0.040 inch. It is to be noted that I form a slot 73 in line with folding line 64 to permit the passage of transversely moving carriers through my viewer, as will be explained hereinafter. Slot 73 extends from the upper end of guide 68 to the upper edge of wall 50.

A pair of spaced window openings 74 and 76 in back 20 register with window openings 78 and 80 in wall 48 when back 20 is secured to the wall. Openings 82 and 84 in wall 50 register with openings 78 and 80 when wall 50 is folded over wall 48. A pair of respective diffusion windows 86 and 88 formed of any suitable material such as translucent plastic or the like are secured across openings 82 and 84 in any appropriate manner. Preferably windows 86 and 88 and their associated openings are of a size which will accommodate all sizes of transparent film frames in common use.

As can be seen by reference to Figures 1, 3 and 4, I form respective tongues 90 and 92 along the edges of sides 12 and 14. Tongues 90 and 92 are adapted to be inserted in respective slots 94 and 96 formed in top 22 when sides 12 and 14 are bent along folding lines 98 and 100. When this operation is performed, the collapsible housing, indicated generally by the reference character 102, of my viewer is erected. I form blank 10 with an opening 104 which extends into base 16 and front 18 to accommodate the nose of a person using my viewer. With the housing 102 of my viewer erected as shown in Figure 3, a pair of respective transparencies registering with windows 86 and 88 may be viewed through lenses 60 and 62 with the desired stereoptic effect. With the viewer in use, light is admitted to the space enclosed by housing 102 substantially solely through windows 86 and 88. This light passes through the transparencies to permit them to be viewed.

Referring now to Figures 3 to 9, when my viewer is to be used with a rotary transparency carrier 106, I provide the carrier support formed by walls 48 and 50 with an insert 108 having a base 110 and an upper arcuate surface 112. Insert 108 is adapted to be slid up between walls 48 and 50 and between guides 66 and 68 until base 110 engages the lower edges of walls 48 and 50. It is held in this position by friction. The rotary carrier 106, in which a plurality of film frames 114 or the like are mounted, is adapted to be inserted between walls 48 and 50 to rest upon and be guided by the upper arcuate surface 112 of insert 108. In this position of the carrier, it can be rotated successively to register diametrically opposite film frames 114 with windows 86 and 88. As is known in the art, a pair of diametrically opposite frames of a rotary carrier depict one scene to be viewed. Carrier 106 includes a plurality of spaced positioning slots 116 adjacent its periphery.

Referring now more particularly to Figures 1 and 7 to 9, the bases of window openings 78 and 80 open into respective slots 118 and 120 into which the respective ends 122 and 124 of a leaf spring 126 extend. In order to assemble spring 126 in position on wall 48, I stamp or otherwise form a pair of upstanding lugs 128 and 130 in the central portion of the spring. Lugs 128 and 130 are pushed through the portion of wall 48 between slots 118 and 120 and are bent over to retain the spring on the wall. The respective ends 122 and 124 of spring 126 carry rounded bosses 132 and 134, the spacing between which being such that they engage a pair of corresponding slots 116 of a rotary carrier properly to register a pair of diametrically opposite film frames 114 with windows 86 and 88. When a person using my viewer with a rotary carrier 106 desires to change the scene being viewed, the carrier is manually moved in the direction of the arrow A, for example, in Figure 9 to cause bosses 132 and 134 to be cammed out of or to ride out of a pair of slots 116. This rotation of the disk or wheel 106 is continued until the bosses engage the next pair of slots corresponding to the film frames depicting the next scene to be viewed.

Referring now to Figure 10, my viewer may be used with a transparency carrier including a chain of members 136, each of which carries a pair of spaced film frames or the like 138. Hinge pins 140 may be employed to connect a series of members 136 to form a continuous strip carrier. Each of the members 136 is formed with a pair of spaced slots 142 and 144. When one scene is being viewed, the bosses 132 and 134 engage the slots 142 and 144 of a member 136 and the transparencies 138 carried by the member register with windows 86 and 88. When the next scene is to be viewed, the chain of members 136 is moved laterally of my viewer as, for example, in the direction of the arrow B. In the course of this movement, bosses 132 and 134 are cammed out of one pair of slots 142 and 144 and into the slots 142 and 144 in the next member 136 properly to register the transparencies of this member with windows 86 and 88. It will be appreciated that in this use of my viewer, the strip of members passes between walls 48 and 50 through the space separating the respective guide members 66 and 68 from the members 70 and 72. These guides 66, 68, 70 and 72 support and guide the strip in its travel through my viewer.

Referring now to Figure 11, my viewer may be employed with a carrier, indicated generally by the reference character 146, which moves vertically with respect to the viewer. It is to be understood that in this use of my viewer the insert 108 is removed to permit passage of the carrier 146 through the device. The carrier 146 includes a plurality of individual members 148, each of which supports a pair of transparencies such as film frames 150. Pins or the like 152 hingedly connect adjacent members 148 to form a train of members. Each of the members 148 includes a pair of spaced slots 154 and 156. Slots 154 and 156 are adapted to be engaged by the bosses 132 and 134 properly to register the transparencies 150 of a member with the windows 86 and 88. When the scene being viewed is to be changed, the carrier 146 is moved vertically, as for example in the direction of the arrow C, to cam bosses 132 and 134 out of slots 154 and 156. As this movement continues, the bosses ride into the slots 154 and 156 of the member carrying the frames next to be viewed. In the course of its movement through my viewer, the carrier 146 is guided by guides 70, 72, 66 and 68.

In use of my universal collapsible viewer, in order to handle and ship or otherwise transport the carrier, housing 102 is collapsed by removing tongues 90 and 92 from slots 94 and 96, folding the sides 12 and 14 inwardly of base 16, and collapsing the housing to the position shown in Figure 2. It will be appreciated that in this condition of my viewer, it may be, for example, mailed in an envelope. Since it is light as compared with plastic and metal viewers of the prior art and less bulky, it is considerably less expensive to package and ship. Further, a salesman or demonstrator can conveniently carry a relatively large supply of collapsible viewers. When the viewer is to be used to view transparencies, the collapsible housing 102 is raised and sides 12 and 14 are erected. Tongues 90 and 92 are inserted in the respective slots 94 and 96 to maintain housing 102 in its erected position. Where a rotary carrier is employed, insert 108 is slid between walls 48 and 50 and is properly positioned by its base 110 and by guides 66 and 68. To view film frames or the like in a carrier 106, the carrier is inserted between walls 48 and 50 to rest on the upper arcuate surface 112 of insert 108. Carrier 106 then is rotated, as for example in the direction of arrow A in Figure 9, until a pair of slots 116 are engaged by bosses 132 and 134 to register a pair of diametrically opposite frames 114 with windows 86 and 88. Light admitted to the space enclosed by housing 102 through translucent windows 86 and 88 is transmitted through the transparencies to permit the scene depicted to be viewed binocularly through lenses 60 and 62 with the desired stereoscopic effect. In order to change the scene being viewed, carrier 106 is rotated until the next pair of locating slots 116 is engaged by the pair of bosses 132 and 134.

When a strip of members 136 is used with my viewer, the strip is passed transversely through the viewer as, for example, in the direction of the arrow B until a pair of slots 142 and 144 is engaged by the pair of bosses 132 and 134 properly to register transparencies 138 with windows 86 and 88. To change the scene being viewed, the strip of members 136 is moved laterally until another pair of locating slots 142 and 144 is engaged by bosses 132 and 134 which register the next scene of film frames with windows 86 and 88.

When my viewer is to be used with a vertically moving carrier 146 as shown in Figure 11, bosses 132 and 134 engage a pair of slots 154 and 156 to register a pair of frames with the windows. When the scene is to be changed, carrier 146 is moved vertically to engage another pair of slots 154 and 156 with bosses 132 and 134. It will be seen that my viewer can accommodate all three types of transparency carriers. It is to be noted further that the windows 86 and 88 are made sufficiently large to accommodate all the commonly used film sizes.

It will be seen that I have accomplished the objects of my invention. I have provided a universal collapsible transparency viewer which may readily be collapsed for storage and transportation and which may readily be erected. In its collapsed state my viewer is sufficiently flat that it may be mailed in an envelope. It is light and not bulky when collapsed so that it may be wrapped and shipped at less expense than transparency viewers of the prior art. My viewer is adapted to accommodate vertically moving, transversely moving and rotary transparency carriers. It is simple in construction and inexpensive to manufacture.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A universal collapsible transparency viewer for viewing transparencies supported in a carrier including in combination an integral collapsible housing comprising a bottom wall carrying a pair of end walls having tongues, a front wall formed with a pair of lens-receiving apertures and a top wall formed with openings to receive said tongues to erect said housing, and an integral elongated sleeve having a first side formed integrally with said top wall and having a second side, means for securing said bottom wall to said sleeve so that a portion of said sleeve forms a back wall of said housing, said sleeve sides being formed with pairs of aligned light-admitting openings in said sleeve portion forming said back wall, said sleeve being proved with means for guiding said carrier to a position at which a pair of transparencies are aligned with said light-admitting openings.

2. A universal collapsible transparency viewer as in claim 1 in which said sleeve is formed with a pair of side openings through which a carrier is adapted to be passed through said sleeve adjacent said light-admitting openings and in which said guide means is adapted to guide a carrier for movement laterally of said sleeve.

3. A universal collapsible transparency viewer as in claim 1 in which said sleeve is formed with top and bottom openings and in which said guide means is adapted to guide a carrier for movement axially of said sleeve to permit a pair of transparencies to be aligned with said light-admitting openings.

4. A universal collapsible transparency viewer as in claim 1 in which said guide means comprises a removable insert adapted to be positioned within said sleeve to provide an arcuate surface for supporting a carrier for rotary movement to permit a pair of transparencies to be aligned with said light-admitting openings.

5. A universal collapsible transparency viewer as in claim 1 including interengageable means on said carrier and on said sleeve for locating said carrier in a position at which a pair of transparencies are aligned with said light-admitting openings.

6. A universal collapsible transparency viewer as in claim 1 including a pair of lenses disposed in said lens-receiving openings and integral tabs carried by said front wall for retaining said lenses in said lens-receiving apertures.

References Cited in the file of this patent

UNITED STATES PATENTS

| | | |
|---|---|---|
| 2,131,444 | Lateltin et al. | Sept. 27, 1938 |
| 2,724,991 | Levine | Nov. 29, 1955 |

FOREIGN PATENTS

| | | |
|---|---|---|
| 461,795 | Italy | Feb. 14, 1951 |

UNITED STATES PATENT OFFICE
CERTIFICATE OF CORRECTION

February 10, 1959

Patent No. 2,872,844      Sidney Van Tuyl

It is hereby certified that error appears in the printed specification of the above numbered patent requiring correction and that the said Letters Patent should read as corrected below.

Column 6, line 33, for "proved" read -- provided --; line 43, strike out "openings and sleeve adjacent said light-admitting open-".

Signed and sealed this 2nd day of June 1959.

(SEAL)
Attest:

KARL H. AXLINE
Attesting Officer

ROBERT C. WATSON
Commissioner of Patents